(12) United States Patent
Lim (10) Patent No.: US 10,196,032 B1
(45) Date of Patent: Feb. 5, 2019

(54) SAFETY RESTRAINT LOAD DISPERSAL BRACE APPARATUS

(71) Applicant: Thomas D. Lim, Phoenix, AZ (US)

(72) Inventor: Thomas D. Lim, Phoenix, AZ (US)

( * ) Notice: Subject to any disclaimer, the term of this patent is extended or adjusted under 35 U.S.C. 154(b) by 0 days.

(21) Appl. No.: 15/607,375

(22) Filed: May 26, 2017

(51) Int. Cl.
| | |
|---|---|
| *B60R 22/14* | (2006.01) |
| *A62B 35/04* | (2006.01) |
| *B60R 22/28* | (2006.01) |
| *A62B 35/00* | (2006.01) |
| *B60R 22/12* | (2006.01) |

(52) U.S. Cl.
CPC .......... *B60R 22/14* (2013.01); *A62B 35/0012* (2013.01); *A62B 35/04* (2013.01); *B60R 22/28* (2013.01); *A62B 35/0006* (2013.01); *B60R 22/12* (2013.01)

(58) Field of Classification Search
CPC ......... B60R 22/14; B60R 22/28; B60R 22/12; B60R 22/105; A62B 35/0012; A62B 35/04; A62B 35/0006; B60N 2/2839; B60N 2/2866
USPC ........................................ 297/468, 470, 482
See application file for complete search history.

(56) References Cited

U.S. PATENT DOCUMENTS

| | | | |
|---|---|---|---|
| 3,724,452 A * | 4/1973 | Nitschke | ................. A61F 5/055 128/DIG. 23 |
| 3,827,716 A * | 8/1974 | Vaughn | ................. A41D 13/018 2/DIG. 3 |
| 3,901,550 A | 8/1975 | Hamy | |
| 3,941,404 A | 3/1976 | Otaegui-Ugarte | |
| 3,968,994 A | 7/1976 | Chika | |
| 4,502,732 A * | 3/1985 | Williams | ................ B60R 22/14 297/471 |
| 5,125,718 A | 6/1992 | Czernakowski | |
| 5,161,824 A | 11/1992 | Li | |
| 5,275,468 A | 1/1994 | Vacanti | |
| D349,589 S | 8/1994 | York | |
| 5,387,028 A | 2/1995 | Fulgenzi et al. | |
| 5,562,326 A * | 10/1996 | Stroud | .................... B60R 22/14 297/465 |
| 5,730,498 A * | 3/1998 | Hanson | ................... B60R 22/14 2/2.17 |
| 6,174,032 B1 | 1/2001 | Conaway | |
| 6,273,467 B1 | 8/2001 | Berke et al. | |
| 6,322,149 B1 * | 11/2001 | Conforti | ............... B60R 22/024 297/482 |
| 6,591,430 B1 * | 7/2003 | Sledge | ................. A42B 3/0473 2/421 |
| 6,601,916 B1 * | 8/2003 | Kamiki | ............... B60N 2/2812 297/250.1 |
| 6,733,398 B1 * | 5/2004 | Clerx | ....................... A63G 7/00 2/462 |
| 6,796,584 B1 * | 9/2004 | Hernandez | ........... B60N 2/2812 2/49.1 |
| 8,070,184 B2 | 12/2011 | Hofferberth | |
| 2002/0074847 A1 * | 6/2002 | Terpselas | .............. B60R 22/024 297/483 |

(Continued)

*Primary Examiner* — Mark R Wendell
(74) *Attorney, Agent, or Firm* — Thomas W. Galvani, P.C.; Thomas W. Galvani (57) ABSTRACT

A load-dispersing apparatus, configured to be placed against a torso front, includes a symmetric body having a breastplate, opposed legs extending downwardly from the breastplate, and opposed arms extending upwardly from the breastplate. The breastplate and the arms are rigid, and the legs are flexible.

18 Claims, 7 Drawing Sheets

(56) References Cited

U.S. PATENT DOCUMENTS

| | | | |
|---|---|---|---|
| 2011/0156469 A1* | 6/2011 | Carpenter | B60R 22/105 |
| | | | 297/482 |
| 2012/0025589 A1* | 2/2012 | Calderon, Jr. | B60R 22/14 |
| | | | 297/485 |
| 2013/0221649 A1* | 8/2013 | Diez Marin | B60R 22/14 |
| | | | 280/808 |
| 2016/0144823 A1 | 5/2016 | Williams | |
| 2016/0272147 A1* | 9/2016 | Fisher | B60R 22/023 |

* cited by examiner

SAFETY RESTRAINT LOAD DISPERSAL BRACE APPARATUS

FIELD OF THE INVENTION

The present invention relates generally to safety devices, and more particularly to apparatus for use with safety restraints.

BACKGROUND OF THE INVENTION

Safety restraints, such as three-point seat belts, five-point harnesses, lap belts, and other restraining devices, are used frequently in motor vehicles to prevent movement of a person's body away from the vehicle. When in motion, a motor vehicle and all articles in and on the motor vehicle have momentum, the product of the article's mass and its velocity. Momentum carries an article in the same direction and with the same speed unless the article is acted upon by an outside force.

During an impact, an external object such as a car, railing, tree, etc. slows or stops the movement of the vehicle, thus reducing or eliminating its momentum. However, the object acts only on the vehicle; the momentum of articles within the vehicle is unaffected, and those articles tend to continue in the same direction and with the same speed just after the impact.

This discrepancy in momentum creates secondary impacts: a coffee cup may strike the window, a book may hit the back seat, or sadly, in some cases, a person may be thrown about within or outside of the vehicle. Safety restraints are used to reduce the effects of this momentum discrepancy. Safety restraints hold a person's body against the car seat and attempt to prevent them from moving out of or sideways from the car seat.

Safety restraints have phenomenally lowered fatality rates associated with motor vehicle accidents. Nevertheless, safety improvements continue to be made. Safety belts were provided with automatic pretensioners and locking retractors. Seat belt warning lights and bells were incorporated into cars. Air bags were developed. In short, a great deal of work has been done to ensure that passengers are protected in the event of an impact.

Unfortunately, while safety restraints prevent injuries, they can cause some as well. To reduce the momentum of a person's body, a seat belt exerts a huge amount of pressure against the body. It is not uncommon for a person to sustain a broken rib in an impact, wherein the rib is broken by the interaction of the body against the belt. In other situations, a person may be badly bruised, or their internal organs may be damaged by the pressure exerted by the seat belt. Some individuals, such as the elderly or those with osteoporosis, are especially at risk of injury from the seat belt.

Of course, it is preferable that all individuals use a safety restraint during an impact rather than go without; injuries from safety restraints are statistically less frequent and less severe than those due to an unprotected crash. However, a way to reduce the damage caused by safety restraints, or to prevent the injuries from them, is needed.

SUMMARY OF THE INVENTION

A load-dispersing apparatus, configured to be placed against a torso front, includes a symmetric body having a breastplate, opposed legs extending downwardly from the breastplate, and opposed arms extending upwardly from the breastplate. The breastplate and the arms are rigid, and the legs are flexible.

The above provides the reader with a very brief summary of the detailed description presented below, and is not intended to limit or define in any way the scope of the invention or key aspects thereof. Rather, this brief summary merely introduces the reader to some aspects of the invention in preparation for the detailed description that follows.

BRIEF DESCRIPTION OF THE DRAWINGS

Referring to the drawings.

DETAILED DESCRIPTION

Reference now is made to the drawings, in which the same reference characters are used throughout the different figures to designate the same elements. The drawings illustrate a safety restraint load dispersal brace apparatus (hereinafter, "brace 10") or parts or sections thereof. The brace 10 is suitable for distributing the force of a load exerted by a safety belt during a sudden change in momentum, as would occur in a motor vehicle impact or accident. Though this description will refer primarily to the context of a motor vehicle accident, one having ordinary skill in the art should appreciate that the brace 10 is suitable for use anytime a belt- or strap-based safety restraint is used for restraint and protection. The brace 10 is a strong, rugged, and durable body constructed from a material or combination of materials, or combination of parts, to provide rigidity in some areas and flexibility in others, as will be described.

Figure 6:
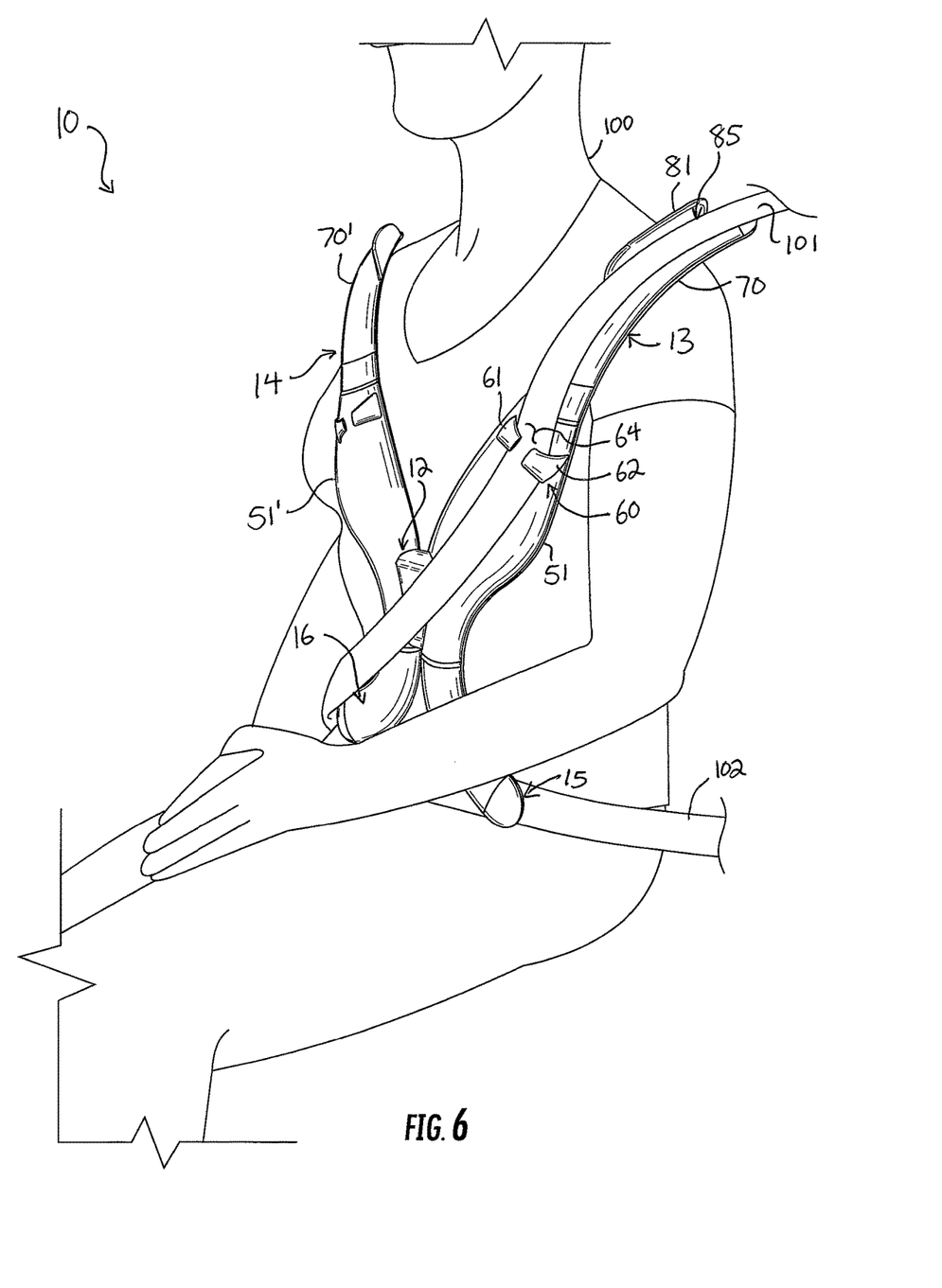
FIG. 6 illustrates the safety restraint load dispersal brace apparatus of FIG. 1 in operation with a user.

The brace has a symmetric, generally X-shaped body 11 including a breastplate 12, opposed arms 13 and 14, and legs 15 and 16 extending radially outward from the breastplate 12. The arms 13 and 14 are preferably formed integrally and monolithically to the breastplate 12, as are the legs 15 and 16, such that these structures of the body 11 are formed to each other without interruption and preferably with a single-piece construction. The body 12 transitions from the breastplate 12 to the arms 13 and 14 generally around the broken demarcation line A in FIG. 1, and transitions from the breastplate 12 to the legs 15 and 16 generally around the broken demarcation line B. In operation, the brace 10 will usually be worn such that the vehicle's shoulder belt extends diagonally across at least one of the arms 13 and 14, across the breastplate 12, and down across one of the legs 15 and 16 opposing the one of the arms 13 and 14, as seen in FIG. 6. When so worn, the arms 13 and 14 generally are disposed across an upper portion of the user's torso and shoulders, and the legs 15 and 16 are disposed against the user's abdomen.

The brace 10 further generally has two sections or halves: a left half and a right half, bifurcated by a line of symmetry C. Briefly, the directions "left" and "right" are used herein from the user's perspective. The left and right halves are symmetric with respect to each other about the line of symmetry C; the brace 10 is ambidextrous and can be used by occupants on both sides of a vehicle. Generally, the arm 13 and leg 15, together with a portion of the breastplate 12, define a left wing 18, and the arm 14 and leg 16, together with an opposing portion of the breastplate 12, define a right wing 18. The wings 17 and 18 are joined by another portion of the breastplate 12, as is explained below.

Figure 2:
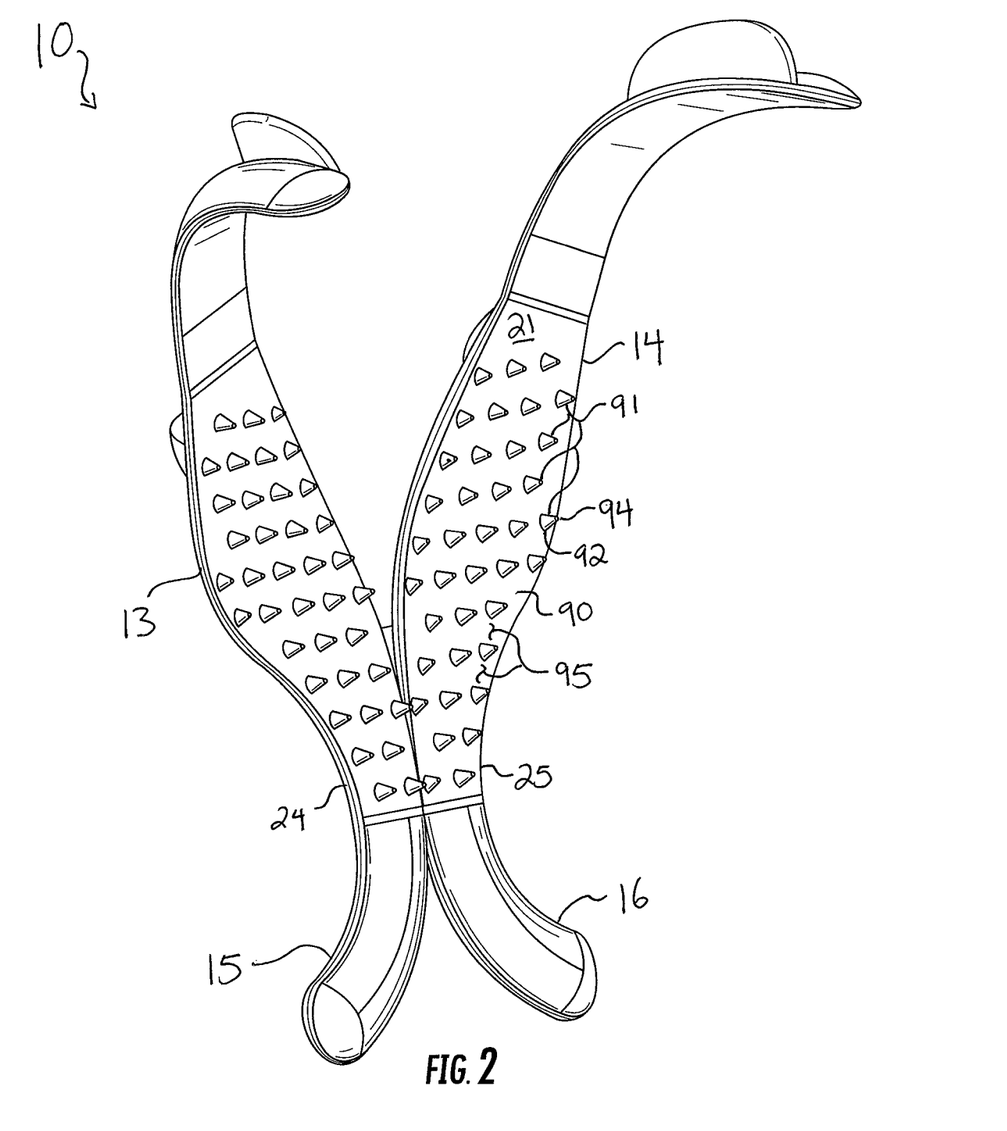

The brace 10 has a front 20 and an opposed back 21 (shown more clearly in FIG. 2). The front and back 20 and 21 extend commonly across all elements of the brace 10. As such, the breastplate 12 has the front 20 and back 21, the arms 13 and 14 have the front 20 and back 21, and the legs 15 and 16 have the front 20 and back 21.

The breastplate 12 of the body 11 extends across the right and left halves 17 and 18. The breastplate 12 has opposed upper and lower ends 22 and 23 which bound and define the breastplate 12 vertically. On the left half 17, the upper end 22 is formed integrally to the arm 13 (hereinafter "left arm 13") with a seamless transition therebetween; the breastplate 12 is formed continuously and contiguously into the left arm 13 without joints or other interruptions. Similarly, on the right half 18, the upper end 23 is formed integrally to the arm 14 (hereinafter, "right arm 14") with a seamless transition therebetween; the breastplate 12 is formed continuously and contiguously into the right arm 14 without joints or other interruptions.

The breastplate 12 has opposed left and right edges 24 and 25, formed at the union of the front 20 and back 21, and which extend between the upper and lower ends 22 and 23 and taper inwardly, arcuately, and concavely. At the upper end 22, the breastplate 12 has a maximum width between the left and right edges 24 and 25. The left and right edges 24 and 25 are directed inwardly and arcuately, and extend to a minimum width at the lower end 23. The width of the breastplate 12, between the left and right edges 24 and 25, thus tapers and is not constant from the upper end 22 to the lower end 23.

The breastplate 12 also includes a bridge 30. The bridge 30 is defined between the left and right wings 17 and 18 and indeed couples and holds the left and right wings 17 and 18 rigid and fixed with respect to each other. The bridge 30 is an integral and monolithic portion of the breastplate 12, and as such is also an integral and monolithic portion of the body 11. The bridge 30 is roughly rectangular prismatic. The bridge 30 has a top 31 just below the upper end 22 and an opposed bottom 32 just above the lower end 23. The bridge 30 has a front 33, common to and contiguous with the front 20 of the body 12, which is flat and set back from or recessed with respect to the front 20 at those portions of the breastplate 12 which flank the bridge 30.

The front 20 of the brace 10 has a varying contour. Generally, over much of the brace 10, the front 20 is merely convex in a horizontal orientation. In other words, when a portion of the brace 10 is viewed from above, the front 20 appears convex: at points, the left arm 13 is convex or bows outwardly, as do the right arm 14, left leg 15, and right leg 16 at different points. At the breastplate 12, however, the contour is more complex. The front 33 of the bridge 30 is flat in a horizontal orientation. To the left of the bridge 30, however, the breastplate 12 is convex, and to the right of the bridge 30, the breastplate 12 is also convex. The front 33 of the bridge 30 is recessed with respect to these areas, such that the front 20 of the breastplate 12 is convex at the left wing 17, recessed at the bridge 30, and convex at the right wing 18.

The legs 15 and 16 radiate downwardly from the lower end 23 of the breastplate 12. The legs 15 and 16 are arcuately bent extensions on the left and right wings 17 and 18, and are opposite but otherwise identical.

The leg 15 extends to the user's left, and as such is referred to hereinafter as the "left leg 15." The left leg 15 has a top 40 which is formed to the lower end 23 of the breastplate 12, and the left leg 15 extends to a free bottom 41, opposed from the top 40. The top 40 is formed integrally and monolithically to the breastplate 12, such that the two structures are formed continuously and contiguously together, without interruption and preferably with a single-piece construction.

Figure 1:
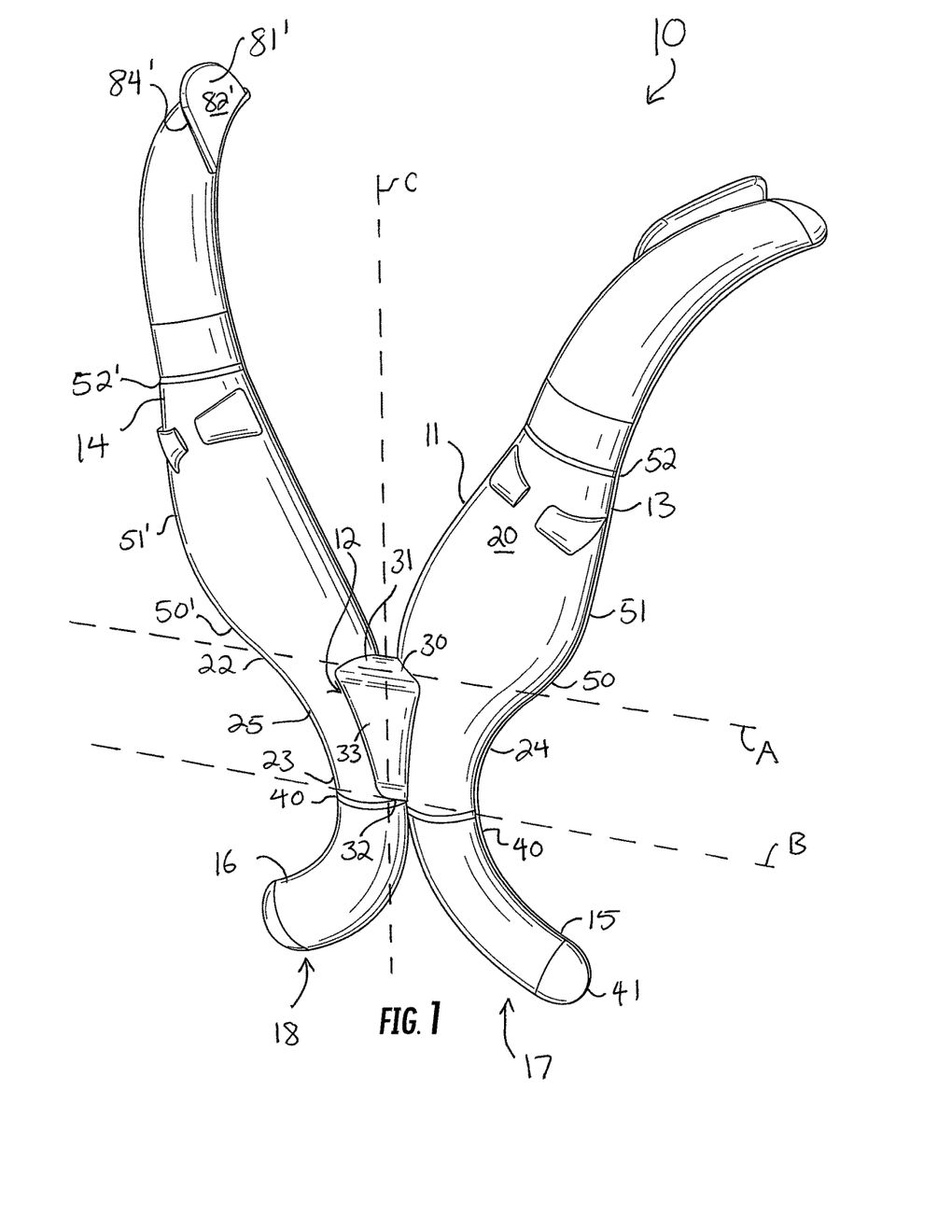
FIGS. 1 and 2 are front and rear perspective views, respectively, of an embodiment of a safety restraint load dispersal brace apparatus.
Figure 3:
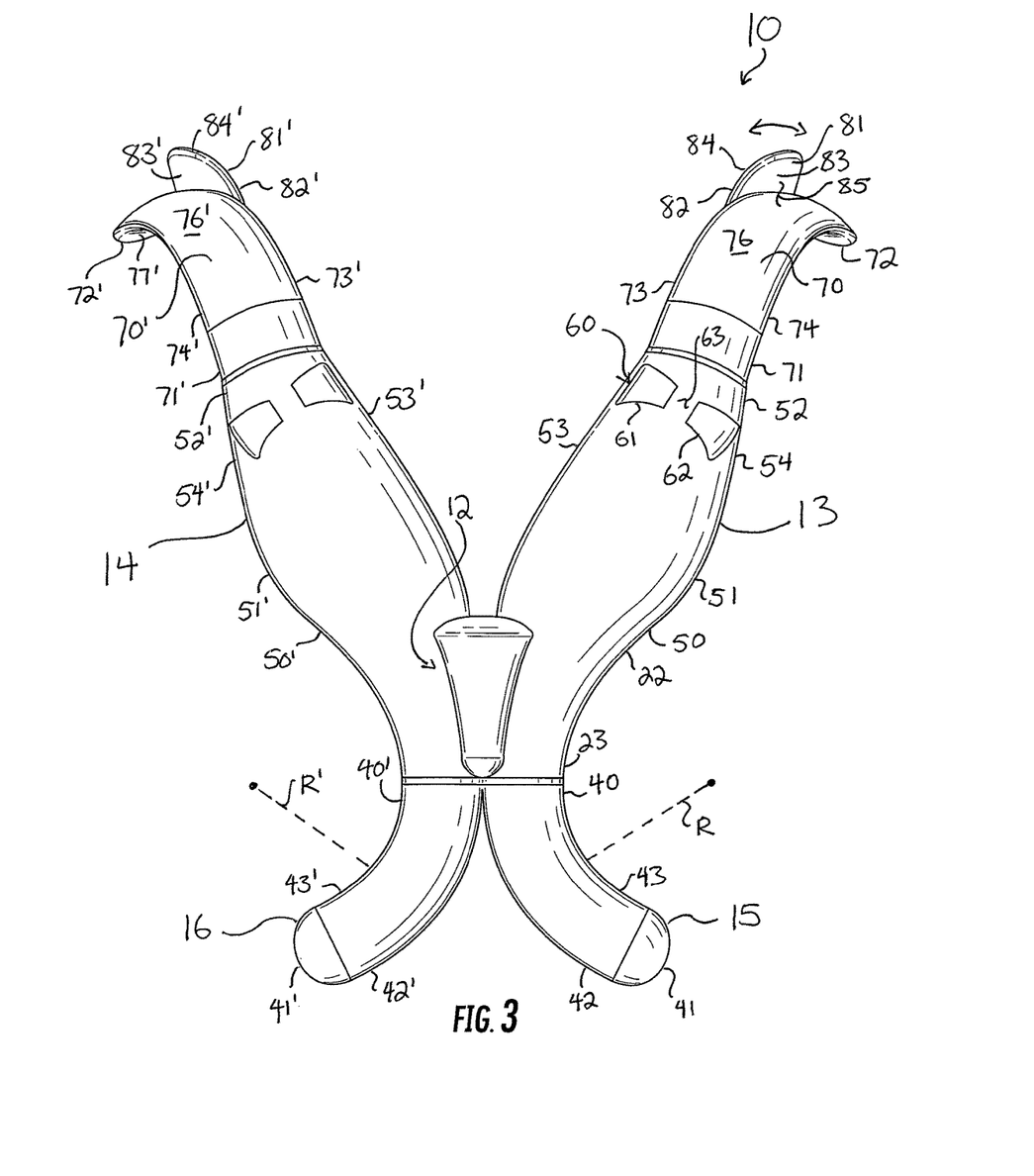
FIGS. 3 and 4 are front and left side elevation views, respectively, thereof.

Referring to FIG. 1 and FIG. 3, the left leg 15 has an inner edge 42 and an opposed outer edge 43, which union at the bottom 41 of the left leg 15, and which separate the front 20 and back 21 at the left leg 15. The left leg 15 has a constant width between the inner and outer edges 42 and 43 from the top 40 to the bottom 41, and also has a generally constant cross-sectional profile from the top 40 to the bottom 41. The left leg 15 does, however, curve about a point D, with the curvature of the outer edge 43 defined by a constant radius R to the point D, and the curvature of the outer edge defined by a constant radius greater than the radius R by the width of the left leg 15 between the inside and outside edges 42 and 43. Thus, the left leg 15 has a generally constant profile. The front 20 of the left leg 15 is convex.

The leg 16 extends to the user's right, and is thus referred to hereinafter as the "right leg 16." Again, the right leg 16 is identical to the left leg 15; as such, the various structural elements and features of the right leg 16 carry the same reference characters as those of the left leg 15 but are marked with a prime ("'") symbol. The right leg 16 has a top 40' which is formed to the lower end 23 of the breastplate 12, and the right leg 16 extends to a free bottom 41', opposed from the top 40'. The top 40' is formed integrally and monolithically to the breastplate 12, such that the two structures are formed continuously and contiguously together, without interruption and preferably with a single-piece construction.

The right leg 16 has an inner edge 42' and an opposed outer edge 43', which union at the bottom 41' of the right leg 16, and which separate the front 20 and back 21 at the right leg 16. The right leg 16 has a constant width between the inner and outer edges 42' and 43' from the top 40' to the bottom 41', and also has a generally constant cross-sectional profile from the top 40' to the bottom 41'. The right leg 16 does, however, curve about a point D', with the curvature of the outer edge 43 defined by a constant radius R' to the point D', and the curvature of the outer edge defined by a constant radius greater than the radius R' by the width of the right leg 16 between the inside and outside edges 42' and 43'. Thus, the right leg 16 has a generally constant profile. The front 20 of the right leg 16 is convex.

The left and right legs 15 and 16 are constructed of a material or combination of materials, or are manufactured in such a way that they are flexible. While the breastplate 12 is rigid, the left and right legs 15 and 16 can be moved flexibly with respect to the breastplate 12. The breastplate 12 is rigid: it cannot bend or bow forwardly or rearwardly away from the line C, nor can it bend or bow laterally in either direction toward or away from the line C, nor can it twist or be torqued. This rigidity is defined within the context of the forces typically experienced during a motor vehicle impact. These forces are quite high. Nevertheless, the breastplate 12 maintains rigidity, as defined above, even at such forces. This is contrasted with other structures which may yield, or may be designed to yield, at such forces or at lesser forces.

The left and right legs 15 and 16, in contrast, are flexible in that they are each capable of deflecting in a variety of directions: first, they can deflect and be deformed forwardly and rearwardly away from the line C; second, they can deflect and be deformed laterally in either direction toward or away from the line C; third, they can twist or be twisted. The left and right legs 15 and 16 exhibit such flexibility in response to very low forces, such as those produced by a person bending or leaning over and thereby deforming the left and right legs 15 and 16 between their torso and thighs.

One having ordinary skill in the art will readily appreciate that the breastplate 12 demonstrates and maintains its rigidity at very high force levels, and that the left and right legs 15 and 16 exhibit flexibility at very low force levels.

Unlike the left and right legs 15 and 16, the arms 13 and 14 are rigid. The arms 13 and 14 extend upwardly from the breastplate 12 at the upper ends 22 and 23 of the breastplate 12, respectively. Referring primarily to FIG. 3, the arms 13 and 14 are generally aligned linearly outwardly away from the breastplate 12, and are extensions thereof on the left and right wings 17 and 18. The arms 13 and 14 are oppositely disposed and arranged, but are otherwise identical.

The arm 13 extends to the user's left, and as such is referred to hereinafter as the "left arm 13." The left arm 13 has a bottom 50, a middle 51, and a top or free end 52 opposed from the bottom 50. The bottom 50 is formed to the upper end 22 of the breastplate 12, and the left arm 13 extends generally diagonally (with respect to line C) through the middle 51 to the free end 52. The bottom 50 is formed integrally and monolithically to the breastplate 12, such that the two structures are formed continuously and contiguously together, without interruption and preferably with a single-piece construction.

The left arm 13 has an inner edge 53 and an outer edge 54, which separate the front 20 and back 21 at the left arm 13. Those edges 53 and 54 are curvilinear, and, as a result, the left arm 13 varies in width between the bottom 50 and the free end 52. At the bottom 50, the left arm 13 has a width between the inner and outer edges 53 and 54. That width is approximately twice the width of the left leg 15 between its inner and outer edges 42 and 43. The left arm 13 increases in width from the bottom 50 to the middle 51; at the middle 51, the left arm 13 has a width which is about fifteen percent greater than the width at the bottom 50. The left arm 13 then decreases in width from the middle 51 to the free end 52; at the free end 52, the left arm 13 has a width which is roughly thirty-five percent less than the width at the middle 52. Thus, the left arm 13 is initially slightly wide just above the breastplate 12, grows wider near the middle 52, and then narrows toward the free end 53. As such, the left arm 13 defines a larger "pad" area around the middle 51, which, when the brace 10 is worn in a preferred condition exhibited in FIG. 6, is disposed over the pectoral muscles of a user. The front 20 of the left arm 13 is convex.

The arm 14 extends to the user's right, and is thus referred to hereinafter as the "right arm 14." Again, the right arm 14 is identical to the left arm 13; as such, the various structural elements and features of the right arm 15 carry the same reference characters as those of the left arm 13 but are marked with a prime ("'") symbol. The right arm 14 has a bottom 50', a middle 51', and a top or free end 52' opposed from the bottom 50'. The bottom 50' is formed to the upper end 22 of the breastplate 12, and the right arm 14 extends generally diagonally (with respect to line C) through the middle 51' to the free end 52'. The bottom 50' is formed integrally and monolithically to the breastplate 12, such that the two structures are formed continuously and contiguously together, without interruption and preferably with a single-piece construction.

The right arm 14 has an inner edge 53' and an outer edge 54', which separate the front 20 and back 21 at the right arm 14. Those edges 53' and 54' are curvilinear, and, as a result, the right arm 14 varies in width between the bottom 50' and the free end 52'. At the bottom 50', the right arm 14 has a width between the inner and outer edges 53' and 54'. That width is approximately twice the width of the right leg 16 between its inner and outer edges 42' and 43'. The right arm 14 increases in width from the bottom 50' to the middle 51'; at the middle 51', the right arm 14 has a width which is about fifteen percent greater than the width at the bottom 50'. The right arm 14 then decreases in width from the middle 51' to the free end 52'; at the free end 52', the right arm 14 has a width which is roughly thirty-five percent less than the width at the middle 52'. Thus, the right arm 14 is initially slightly wide just above the breastplate 12, grows wider near the middle 52', and then narrows toward the free end 53'. As such, the right arm 14 defines a larger "pad" area around the middle 51', which, when the brace 10 is worn in a preferred condition exhibited in FIG. 6, is disposed over the pectoral muscles of a user. These widths—and these relative widths—of the different portions of the right arm 14 are effective at distributing the load of the user's body, centered at the pectoral muscles against this pad area, so that a major portion of the brace 10 receives the load of the user's body during an emergency event. It allows the brace 10 to be lightweight yet strong, durable, and effective at distributing a heavy and fast force, as would be experienced during an impact or other emergency event. The front 20 of the right arm 14 is convex.

The left and right arms 13 and 14 are constructed of the same material as the breastplate, and are thus similarly rigid: they cannot bend or bow forwardly or rearwardly away from the line C, nor can they bend or bow laterally in either direction toward or away from the line C, nor can they twist or be torqued. As with the breastplate 12, this rigidity is defined within the context of the quite high the forces typically experienced during a motor vehicle impact. The left and right arms 13 and 14 maintain rigidity, as defined above, even at such forces. This is contrasted with other structures which may yield, or may be designed to yield, at such forces or at lesser forces.

Figure 4:
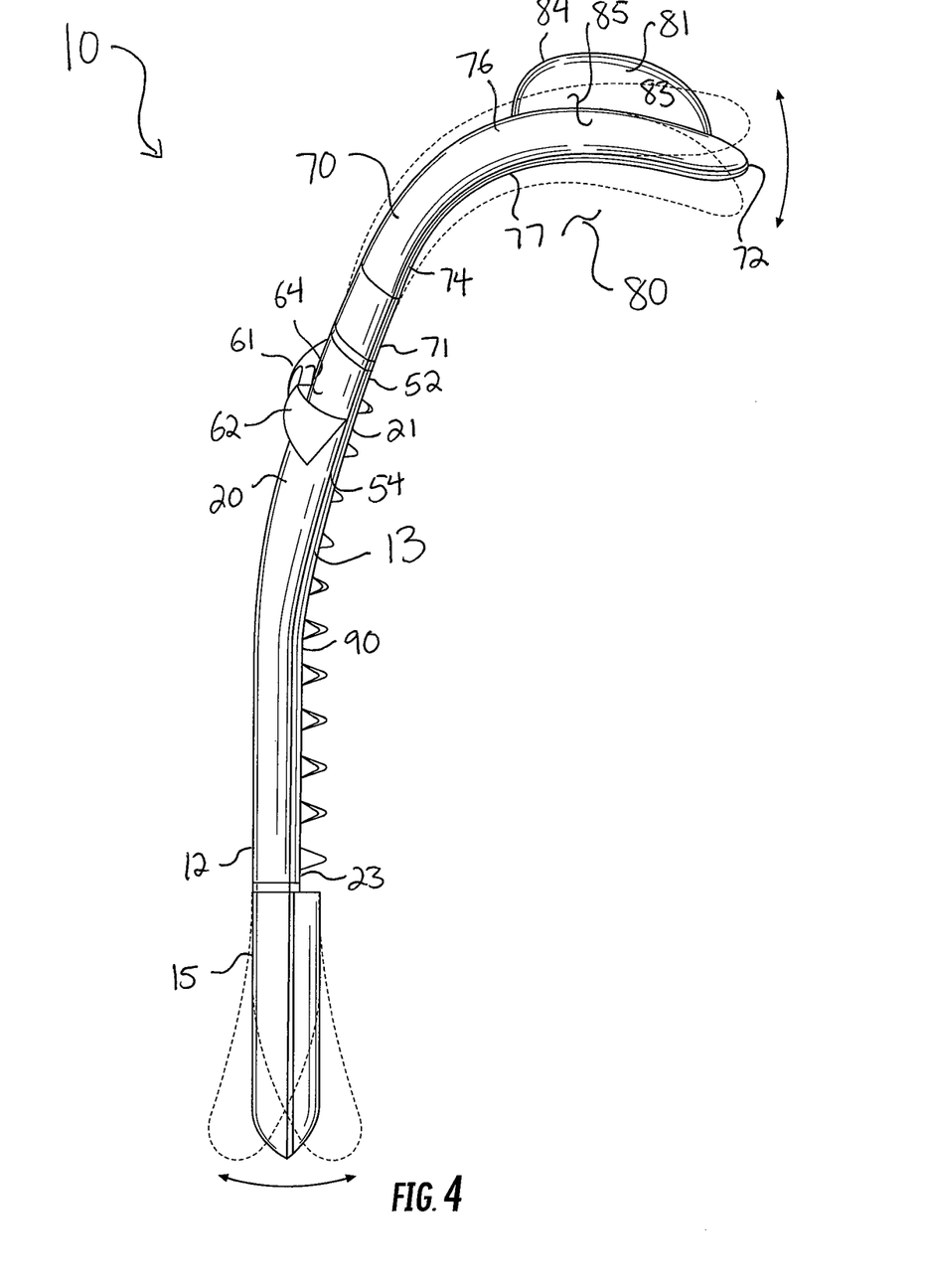

In the embodiments shown in the several drawings, the left and right arms 13 and 14 each carry retention structures for locating and then retaining a shoulder belt in a desired position. The structure is described herein only with respect to the left arm 13, with the understanding that the identical structure is on the right arm 14 as well. Referring to FIGS. 3 and 4, the structure is a catch 60 formed by opposed fingers 61 and 62 oriented toward each other but spaced apart by a gap 63. The fingers 61 and 62 are curved projections formed integrally to and projecting upwardly from the front 20 of the left arm 13 proximate to the inner and outer edges 53 and 54, respectively. The finger 61 is disposed proximate the inner edge 53 and projects up and then across the front 20 toward the outer edge 54. In contrast, the finger 62 is disposed proximate the outer edge 54 and projects up and then across the front 20 toward the outer edge 54. The fingers 61 and 62 have parallel free ends spaced apart by the gap 63. The fingers 61 and 62 cooperate with the front 20 of the left arm 13 to bound and define a hold 64. The hold 64 extends nearly entirely between the inner and outer edges 53 and 54. Formed integrally to the left arm 13, the fingers 61 and 62 are rigid. In some embodiments, the brace 10 is formed without the catches 60; on such embodiments, rather than threading or routing the shoulder belt through the catch 60, the belt is routed across one of the left and right arms 13 and 14, the breastplate 12, and one of the left and right legs 15 and 16.

Figure 5:
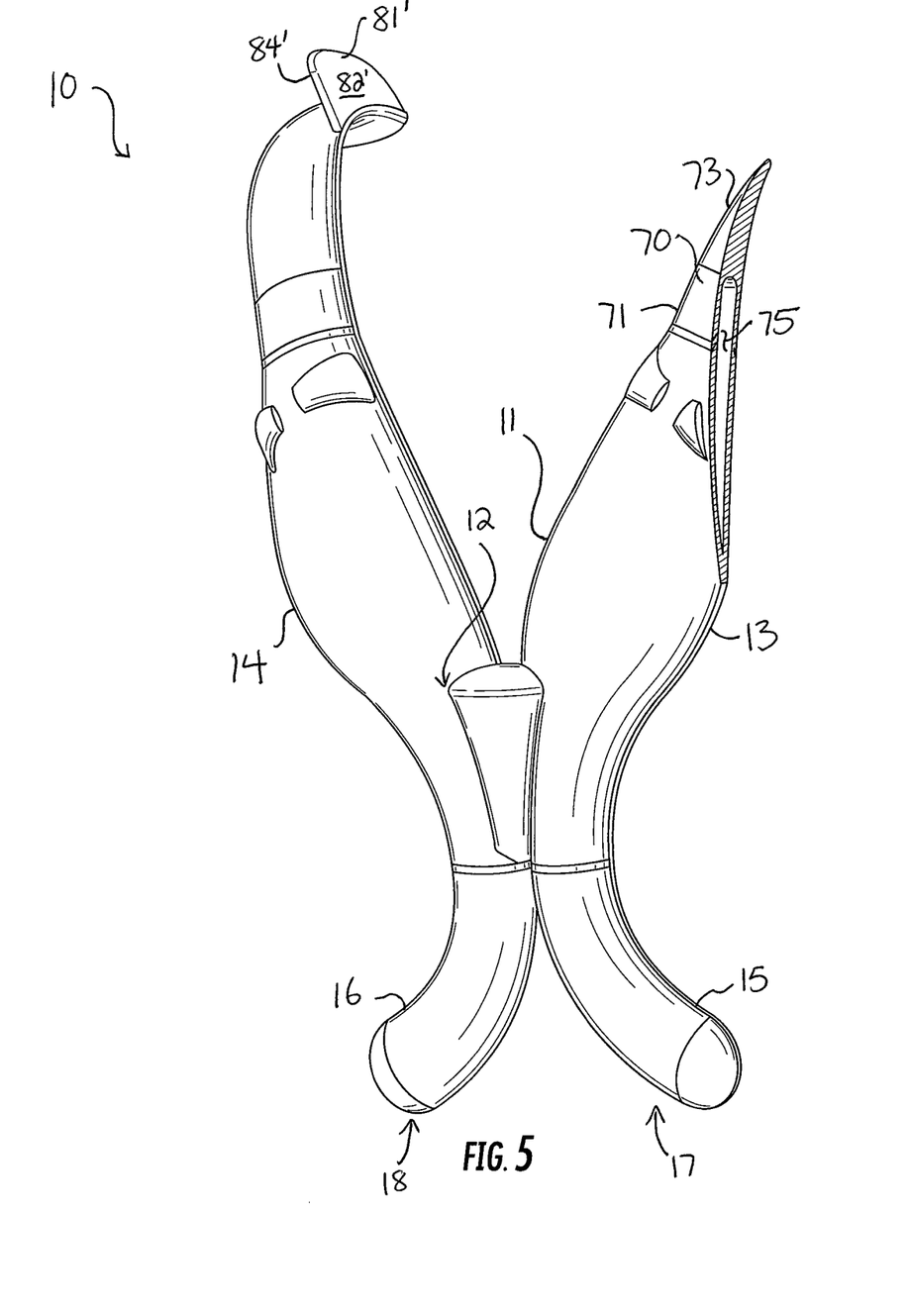
FIG. 5 is a partial section, front perspective view thereof.

The free ends 52 and 52' of the left and right arms are fitted with sleeves 70 and 70'. The sleeves 70 and 70' are identical but opposite, and only the sleeve 70 will be described with the understanding that the discussion applies equally to the sleeve 70'. Referring primarily to FIGS. 3, 4, and 5, the sleeve 70 is a flexible cap or casing fitted over the free end 52 and which wraps arcuately backward away from the generally flat plane of the rest of the brace 10. The sleeve 70 is preferably not formed integrally to the body 11 of the brace 10, but in some embodiments may be depending on manufacturing techniques. Generally, the sleeve 70 is simply stretch-fit, heat-shrunk onto the free end 52, or otherwise adhered to the free end 52.

The sleeve 70 has a bottom 71, a top 72, an inner side 73, and an opposed outer side 74. The bottom 71 has an opening 75 which is fit over the free end 52 of the left arm 13. The sleeve 70 extends upwardly, generally aligned with the left arm 13 initially, and then approximately halfway along its length, bends rearwardly with a gentle curve, seen best in FIG. 4. The sleeve 70 has a front 76 an opposed back 77; due to this rearward bend, the front 76 is convex (from the bottom 71 to the top 72) and the back 77 is concave (from the bottom 71 to the top 72), curving rearwardly to define a receiving space 80. The receiving space 80 is bound at its top by the back 77 of the sleeve 70 near the top 72 of the sleeve 70, and is bound at its front by the back 77 of the sleeve 70 near the bottom 71 of the sleeve 70.

The front 76 is not only convex from the bottom 71 to the top 72, but is convex from the inner side 73 to the outer side 74. The front 76 of the sleeve 70 has a gentle curve corresponding to the convex front 20 of the left arm 13 proximate to the free end 52. Further, the bottom 71 of the sleeve 70 is snug fit down against the free end 52, and so there is a smooth transition from the front 20 of the left arm 13 to the front 76 of the sleeve 70, without bumps, gaps, or other interruptions. The back 77 of the sleeve 70, however, is flat between the inner side 73 and the outer side 74. This corresponds to the flat back 21 of most of the body 11.

Proximate to the top 72 of the sleeve 70, extending just downward below the top 72 and along the inner side 73, is a fin structure 81. Referring primarily to FIGS. 3 and 4 now, the fin structure 81 is a laterally-thin vertical projection rising upwardly from the inner side 73. The fin structure 81 has an inner face 82, an opposed outer face 83, and a peripheral edge 84 defined therebetween. The fin structure 81 is thin between the inner and outer faces 82 and 83. The peripheral edge 84 rises upwardly proximate to the top 72 of the sleeve 70, bends forwardly and generally horizontally (when the device is worn in the preferred condition) to approximately one-third of the distance between the bottom 71 and top 72, and then bends downward back to the inner side 73. The fin structure 81 cants slightly outwardly away from the user as it projects upwardly, such that it curls or leans a few degrees outwardly and thus overhangs the front 76 of the sleeve 70. The fin structure 81 is formed integrally and monolithically in a one-piece construction to the sleeve 70, such that there are no seams, welds, or other unions between the fin structure 81 and the sleeve 70. The outer face 83 of the fin structure 81, together with the front 76 of the sleeve 70 proximate to the top 72, define a nook 85, which is an acute sheltered space bound therein.

The sleeve 70 is constructed of a material or combination of materials, or is manufactured in such a way that it is flexible. The sleeve 70 can be moved flexibly with respect to the left arm 13. While the left arm 13 is rigid, as discussed previously, the sleeve 70 is flexible. Because a lower portion of the sleeve 70 is fit over the free end 52 of the left arm 13, some of the flexibility of the sleeve 70 at and proximate to the bottom 71 is reduced, but near the top 72, the sleeve 70 is flexible. The sleeve 70 can deflect and be deformed forwardly and rearwardly, as shown in FIG. 4 by the broken lines defining maximum forwardly- and rearwardly-deformed positions of the sleeve 70. The sleeve 70 does resist bending in a lateral direction, however. The fin structure 81 is flexible as well, capable of being deflected and deformed in the lateral direction, as shown by the double-arrowed arcuate line in FIG. 3. Moreover, the sleeve 80 is preferably constructed from a tacky material or material having tacky or non-slip properties.

As described above, the sleeve 70' is identical but opposite to the sleeve 70. The sleeve 70' has all the same structural elements and features as the sleeve 70 (so referenced and designated with a prime ("'") symbol): a bottom 71', a top 72', an inner side 73', an outer side 74', an opening 75', a front 76', a back 77', a space 80', and a fin structure 81' with an inner face 82', outer face 83', peripheral edge 84', and nook 85'. Not all of these structural elements and features are marked in the drawings, as one having ordinary skill in the art will understand their structures and arrangement from the applicable discussion of the sleeve 70.

A portion of the back 21 is a continuous surface 90 extending from the free ends 52 and 52' of the left and right arms 13 and 14 to the lower end 23 of the breastplate 12, as shown in FIG. 4. Turning to FIG. 2, the surface 90 is formed with a plurality of identical nubs 91; reference herein will generally be made with respect to a single nub 91. Only the surface 90 is formed with the nubs 91; the back of the sleeves 70 and 70' and the back 20 of the left and right legs 15 and 16 do not carry nubs 91.

The nub 91 is a truncated cone projection formed integrally and monolithically on and extending outwardly from surface 90. Although described herein as a truncated cone, other embodiments of the nub 91 are formed in other shapes, such as cylindrical and prismatic. The nub 91 has a circular base 92 and a continuous sidewall extending from the base to a small, flat tip 94. The tip 94 defines a free end of the nub 91. The nub 91 has a height from the base 92 to the tip 94, and a diameter which decreases constantly from the base 92 to the tip 94. The height is just greater than the diameter, and is greater than the amount by which the back of the left and right legs 15 and 16 extend beyond the surface 90. Each nub 91 across the surface 90 has the same height so that the nubs 91 are coextensive and terminate an identical distance apart from the surface 90.

The nubs 91 are preferably evenly distributed across the surface 90 and are organized in a staggered arrangement of offset rows. Between each nub 91 in a row, and also between the rows of nubs 91, are gaps 92, which separate each nub 91 from the others and define passageways between the nubs 91. The gaps 91 and passageways allow air to move behind the surface 90, or between the brace 10 and the user. The nubs 91 are flexible and compressible; they can be deflected and deformed laterally, and may also be compressed along their long axes. In this way, the nubs 91 are comfortable against a user's body while still maintaining the back 21 of the brace 10 a distance off of the user's body to promote air flow.

In operation, the brace 10 is worn in a preferred condition, as shown in FIG. 6. The user 100 sits in a conventional manner in motor vehicle with a conventional three-point safety restraint including a shoulder belt 101 and a lap belt 102. The lap belt 102 lies across the lap of the user 100. The shoulder belt 101 extends from an anchor, proximate to the user's hip, diagonally up and across the user's torso and over the shoulder. The brace 10 is disposed between the shoulder belt 101 and the user 100. The sleeves 70 and 70' of the brace 10 are disposed above and in front of the user's shoulders and collar bones. The "pad" area around the middles 51 and 51' of the left and right arms 13 and 14, respectively, are disposed over the pectoral muscles of the user. The breastplate 12 is disposed over the lower portion of the xiphoid body or at the xiphoid process. The left and right legs 15 and 16 are disposed over the soft tissue area of the lower abdomen.

The shoulder belt 101 overlies nearly the entirety of the sleeve 70, from the top 72 to the bottom 71. An inside edge of the shoulder belt 101 is against the outer face 83 of the fin structure 81, and is thus protected from rubbing or engaging the user's neck by the fin structure 81. Further, because the nook 85 is an acute receiving space with the canted fin structure 81 overhanging above, the fin structure 81 and front 76 of the sleeve 70 tend to resist movement of the shoulder belt 101 out of the nook 85, thereby minimizing the likelihood that the shoulder belt will move in an impact with respect to the user's body. Moreover, because the sleeve 70 is constructed of a material with tacky or non-slip characteristics, the sleeve 70 tends to remain in place on the user's body and tends to prevent the shoulder belt 101 from moving with respect to the sleeve, thereby ultimately ensuring that the shoulder belt 101 does not move with respect to the user's body.

Further maintaining the relative positions of the shoulder belt 101 and the brace 10, the shoulder belt 101 is routed through the catch 60. The shoulder belt 101 has been passed through the gap 63 and the width of the shoulder belt 101 is between the fingers 61 and 62 in the hold 64. The shoulder belt 101 is maintained in the hold 64 by the rigidity of the fingers 61 and 62. Moreover, the nubs 91 hold the brace 10 in place on the user's torso by slightly depressing into the user's skin or clothing. Nevertheless, because the nubs 90 are spaced apart by gaps 92, the brace 10 is held just off the user's body, and air can circulate between the body and the brace 10.

From the catch 60, the shoulder belt 101 extends down across the rigid breastplate 12 and then across the right leg 16. The right leg 16 is diagonally aligned with the left arm 13, and so when the brace 10 is worn in the preferred condition with the shoulder belt 101 applied, the shoulder belt 101 will extend across both the left arm 13 and the right leg 16. Similarly, the left leg 15 is diagonally aligned with the right arm 14, so when the brace 10 is worn in the preferred condition with the shoulder belt 101 applied, the shoulder belt 101 will extend across both the right arm 14 and the left leg 15. By "diagonally aligned," it is meant that each of the right arm 14 and left leg 15 (or the left arm 13 and right leg 16) are diagonally oriented along a line with respect to the vertical line of symmetry C, and that the right arm 14 and left leg 15 (of the left arm 13 and right leg 16) are oriented commonly along that line which is diagonally oriented with respect to the symmetry line C.

In the event of an impact, accident, sudden deceleration, or other emergency event, and the momentum of the user's body carries it forward, the shoulder belt 101 is not directly against the user's body. As such, the force exerted against the shoulder belt 101 by the body is not applied along the two-inch width roughly eighteen inches of length for which the shoulder belt 101 would otherwise overly the body. Instead, the body presses against the left arm 13, the breastplate 12, the right leg 16, and portions of the right arm 14 and the left leg 15. Because these portions of the brace 10 are formed integrally and monolithically to each other, and because the breastplate 12 and left and right arms 13 and 14 are rigid, the force exerted is now applied across a much wider area. This distributes the force and means the pressure against the body is lower. Thus, the force against any one part of the user's body is lower than it would be with a conventional seat belt only. The user is much more likely to survive the impact without injuries from the safety restraint.

In the event that the impact has a lateral component, such as in a side impact, the sleeve 70 assists in protecting the user. Because the shoulder belt 101 is retained in the nook 85 of the sleeve 70, and the sleeve 70 is tacky and resists movement on the shoulder and collar bone, the shoulder belt 101 is prevented from moving laterally, thereby maintaining the shoulder belt 101 in the preferred alignment for an impact. If the shoulder belt 101 does move with respect to the body, or moves toward the neck, the fin structure 81 resists this movement, and is interposed between the neck and the shoulder belt 101 to prevent the shoulder belt 101 from digging into, bruising, or even cutting the neck.

Figure 7:
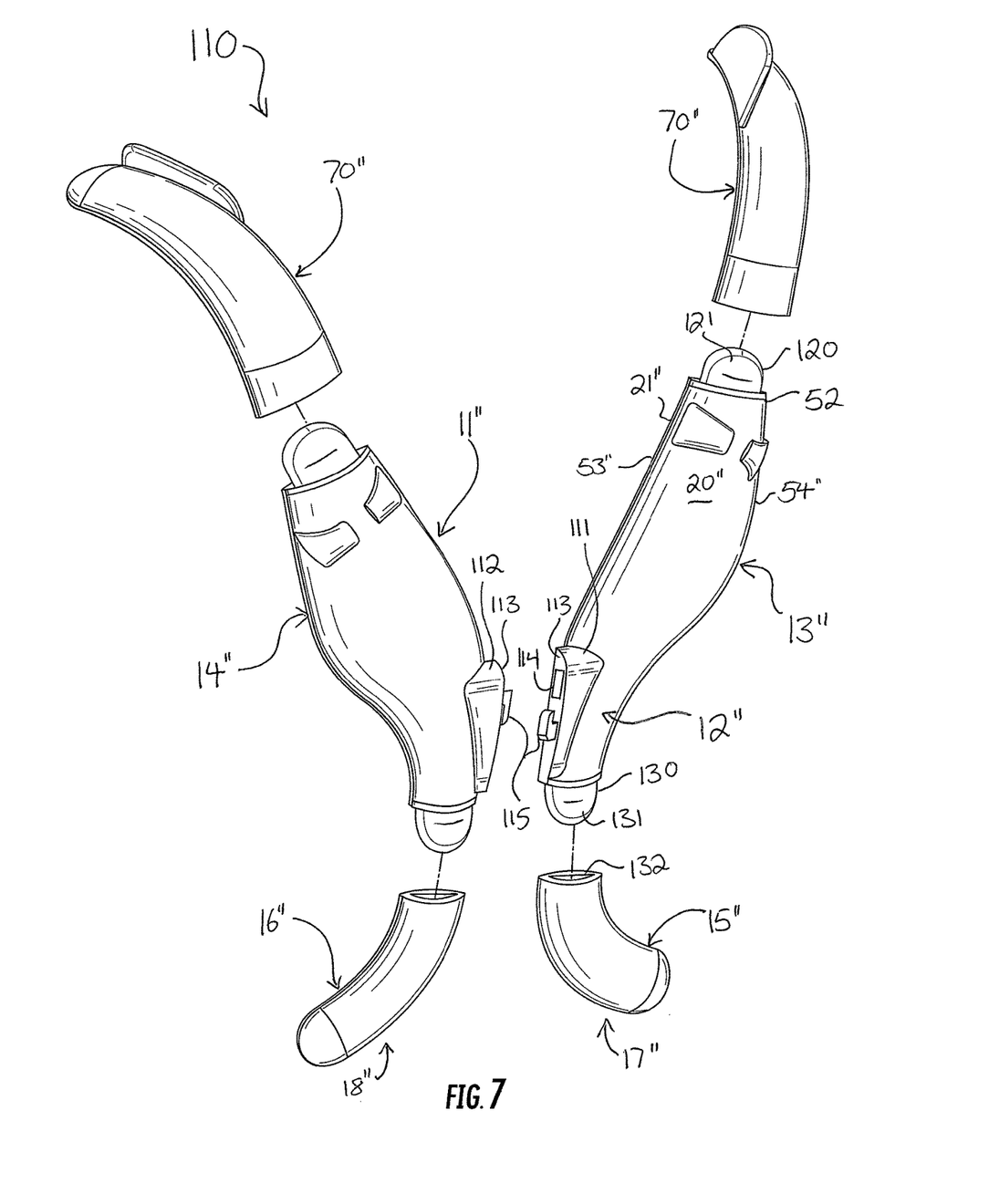
FIG. 7 illustrates an embodiment of a safety restraint load dispersal brace apparatus in a disassembled condition.

FIG. 7 illustrates an embodiment of a safety restraint load dispersal brace apparatus (hereinafter "brace 110"). The brace 110 is very similar to the brace 10, except the brace 110 is assembled from separable and engageable parts. The brace 110 may disassembled so that the user can carry the brace 110 with his or her person, such as may be necessary when traveling away from the user's own vehicle, where the brace 10 would typically be left by the user.

The brace 110 includes all of the structural features and elements that the brace 10 does. In fact, the brace 110 differs from the brace 10 only in that the brace 110 can be disassembled and thus includes additional features not present on the brace 110. As such, the reference characters used to describe the brace 10 above are used to describe the brace 110 as well, but are identified with a double prime ("″") symbol so as to distinguish the structural features and items of the brace 110 from those of the brace 10. The brace 110 thus includes a body 11″, a breastplate 12″, arms 13″ and 14″, legs 15″ and 16″, left and right wings 17″ and 18″, and all the constituent features and elements thereof. That some of the features and elements may be separated by disassembly of the brace 110 does not alter the fact that the brace 110 does include such features and elements. A full description of each of the identical structural features and elements of the brace 110 is not presented here, as one having ordinary skill in the art will readily appreciate the discussion made above with respect to the brace 10 applies equally.

FIG. 7 illustrates the body 11 in an exploded view. Each of the left and right arms 13″ and 14″ is coupled with a sleeve 70″, and the left and right legs 15″ and 16″ are each coupled to the breastplate 12″. The left and rights arms 13″ and 14″ themselves are coupled to each other and may be separated by disassembling the breastplate 12″.

The breastplate 12″ is severed at the bridge 30″ into a left bridge 111 and a right bridge 112, each with an inwardly-directed flat face 113. The flat faces 113 mate in flush contact against each other when the left bridge 111 is coupled to the right bridge 113. Each of the faces 113 is formed with a notch 114 and a catch 115 (the notch 114 on the right bridge 112 is not visible but is just below the catch 115, in reversed arrangement from the notch 114 and catch 115 on the right bridge 113). The notches 114 are each formed with an entrance and an enlarged hook-shaped interior to accommodate the catches 115, which are hook-shaped: the catches 115 have a post and an arm projecting laterally with respect to the post. When the faces 113 of the left and right bridges 111 and 112 are brought together, and the catch 115 of the left bridge 111 is fit into and received in the notch 114 of the right bridge 112, and the catch 115 of the right bridge 112 is fit into and received in the notch 114 of the left bridge 112, the left and right bridges 111 and 112 are engaged but slightly offset. Sliding the left and right bridges 111 and 112 against each other slightly brings them into alignment and also securely couples the left and right bridges 111 and 112 to each other, such that they will not inadvertently come apart.

The left sleeve 70" attaches to the left arm 13" with a tab and slot engagement assembly. At the free end 52 of the left arm 13", a semicircular tab 120 projects upwardly. The tab 120 is smaller in thickness than the free end 52 and is thus set in from the front 20" and back 21", as well as from the inner and outer edges 53" and 54". The tab 120 has an enlarged head 121. The tab 120 projects upwardly toward a slot formed into the sleeve 70". The sleeve 70" extends axially within the sleeve 70" and has a narrowed entrance with a slightly enlarged end portion. The sleeve 70" thus snappedly applies to the left arm 13": when the sleeve 70" is applied to the left arm 13", the enlarged head 121 of the tab 120 passes through the narrowed entrance of the slot and then snaps into the enlarged end portion of the slot, thereby securely coupling the sleeve 70" to the left arm 13" and preventing inadvertent disassembly. The right sleeve 70" is similarly structured and applied to the left arm 14".

The left leg 15" attaches to the breastplate 12" with a tab and slot engagement assembly. At the lower end 23" of the breastplate 12", a semicircular tab 130 projects downwardly. The tab 130 is smaller in thickness than the lower end 23" and is thus set in from the front 20" and back 21". The tab 130 has an enlarged head 131. The tab 130 projects downwardly toward a slot 132 formed into the leg 15" (the slot 132 is identical in construction to the slot in the sleeve 70", and should act as a visual illustration for the slot there). The slot 132 extends axially within the left leg 15" and has a narrowed entrance with a slightly enlarged end portion. The left leg 15" thus snappedly applies to the breastplate 12": when the left leg 15" is applied to the breastplate 12", the enlarged head 131 of the tab 130 passes through the narrowed entrance of the slot 132 and then snaps into the enlarged end portion of the slot 132, thereby securely coupling the sleeve 70" to the breastplate 12" and preventing inadvertent disassembly. The right leg 16" is similarly structured and applied to the breastplate 12". Operation of the brace 110 is similar to operation of the brace 10.

A preferred embodiment is fully and clearly described above so as to enable one having skill in the art to understand, make, and use the same. Those skilled in the art will recognize that modifications may be made to the description above without departing from the spirit of the invention. To the extent that such modifications do not depart from the spirit of the invention, they are intended to be included within the scope thereof.

The invention claimed is:

1. A load-dispersing apparatus configured to be placed against a torso front, comprising:
a symmetric body including a breastplate, opposed legs extending downwardly from the breastplate, and opposed arms extending upwardly from the breastplate;
wherein the arms each have a bottom at the breastplate, free ends opposed from the bottom, and a middle therebetween, each arm increases in width from the bottom to the middle, and each arm decreases in width from the middle to the free end;
the breastplate and the arms are rigid; and
the legs are flexible.

2. The apparatus of claim 1, further comprising:
the arms each terminate in a free end, each free end capped with a sleeve which is flexible and has an inner side and an outer side; and
a fin structure formed on the inner side of each of the sleeves, extending transversely upward from the inner side.

3. The apparatus of claim 1, further comprising:
a back of the body;
a plurality of spaced-apart nubs formed on the back of the body on the breastplate and on the arms.

4. The apparatus of claim 3, wherein:
the arms each terminate in a free end, each free end capped with a sleeve which is flexible and has an inner side and an outer side; and
the back of the body is not formed with nubs on the sleeves and on the legs.

5. The apparatus of claim 1, wherein:
the body defines a torso-receiving space having a front, a top, and opposed sides;
the breastplate is located at the front of the torso-receiving space; and
the arms extend upwardly to the top of the torso-receiving space and overlie the torso-receiving space proximate to the opposed sides.

6. The apparatus of claim 1, wherein:
a one of the arms is diagonally aligned with a one of the legs; and
an other of the arms is diagonally aligned with an other of the legs.

7. A load-dispersing apparatus configured to be placed against a torso front, comprising:
a symmetric body including a breastplate, two opposed legs extending downwardly from the breastplate, and two opposed arms extending upwardly from the breastplate;
the arms each terminate in a free end, each free end capped with a sleeve which is flexible and has an inner side and an outer side; and
a fin structure formed on the inner side of each of the sleeves, extending transversely upward from the inner side.

8. The apparatus of claim 7, wherein:
the breastplate and the arms are rigid; and
the legs are flexible.

9. The apparatus of claim 7, further comprising:
a back of the body;
a plurality of spaced-apart nubs formed on the back of the body on the breastplate and on the arms.

10. The apparatus of claim 9, wherein the back of the body is not formed with nubs on the sleeves and on the legs.

11. The apparatus of claim 7, wherein:
the arms each have a bottom at the breastplate, free ends opposed from the bottom, and a middle therebetween;
each arm increases in width from the bottom to the middle; and
each arm decreases in width from the middle to the free end.

12. The apparatus of claim 7, wherein:

the body defines a torso-receiving space having a front, a top, and opposed sides;

the breastplate is located at the front of the torso-receiving space; and the arms extend upwardly to the top of the torso-receiving space and overlie the torso-receiving space proximate to the opposed sides.

13. The apparatus of claim 7, wherein:

a one of the arms is diagonally aligned with a one of the legs; and an other of the arms is diagonally aligned with an other of the legs.

14. A load-dispersing apparatus configured to be placed against a torso front, comprising:

a symmetric body having a front and a back, and including a breastplate, two opposed legs extending downwardly from the breastplate, and two opposed arms extending upwardly from the breastplate;

wherein the arms each terminate in a free end, each free end is capped with a sleeve which is flexible and has an inner side and an outer side, a fin structure is formed on the inner side of each of the sleeves, extending transversely upward from the inner side; and a plurality of spaced-apart nubs formed on the back of the body on the breastplate and on the arms.

15. The apparatus of claim 14, wherein:

the arms each terminate in a free end, each free end capped with a sleeve which is flexible and has an inner side and an outer side; and the back of the body is not formed with nubs on the sleeves and on the legs.

16. The apparatus of claim 14, wherein:

the arms each have a bottom at the breastplate, free ends opposed from the bottom, and a middle therebetween;

each arm increases in width from the bottom to the middle; and each arm decreases in width from the middle to the free end.

17. The apparatus of claim 14, wherein:

the body defines a torso-receiving space having a front, a top, and opposed sides;

the breastplate is located at the front of the torso-receiving space; and the arms extend upwardly to the top of the torso-receiving space and overlie the torso-receiving space proximate to the opposed sides.

18. The apparatus of claim 14, wherein:

a one of the arms is diagonally aligned with a one of the legs; and an other of the arms is diagonally aligned with an other of the legs.

* * * * *